F. PAFF.
MITER BOX.
APPLICATION FILED MAY 12, 1909.

986,851.

Patented Mar. 14, 1911.

Witnesses,
F. E. Maynard
P. Hasberg.

Inventor:
Frank Paff,
By Geo. H. Strong,
his Atty.

UNITED STATES PATENT OFFICE.

FRANK PAFF, OF SAN FRANCISCO, CALIFORNIA.

MITER-BOX.

986,851. Specification of Letters Patent. Patented Mar. 14, 1911.

Application filed May 12, 1909. Serial No. 495,400.

*To all whom it may concern:*

Be it known that I, FRANK PAFF, citizen of the United States, residing in the city and county of San Francisco and State of California, have invented new and useful Improvements in Miter-Boxes, of which the following is a specification.

My invention relates to carpenters' miter boxes.

The object of the present invention is to provide a simple, cheap, practical miter box which will enable carpenters to use their ordinary saws with it; which will have the various parts coming in contact with the saw teeth formed of wood, so there will be no danger of damage to the saw; and in which these various parts which are subject to wear will be readily renewable.

The invention consists of the parts and the construction and combination of parts as hereinafter more fully described and claimed, having reference to the accompanying drawings, in which—

Figure 1:
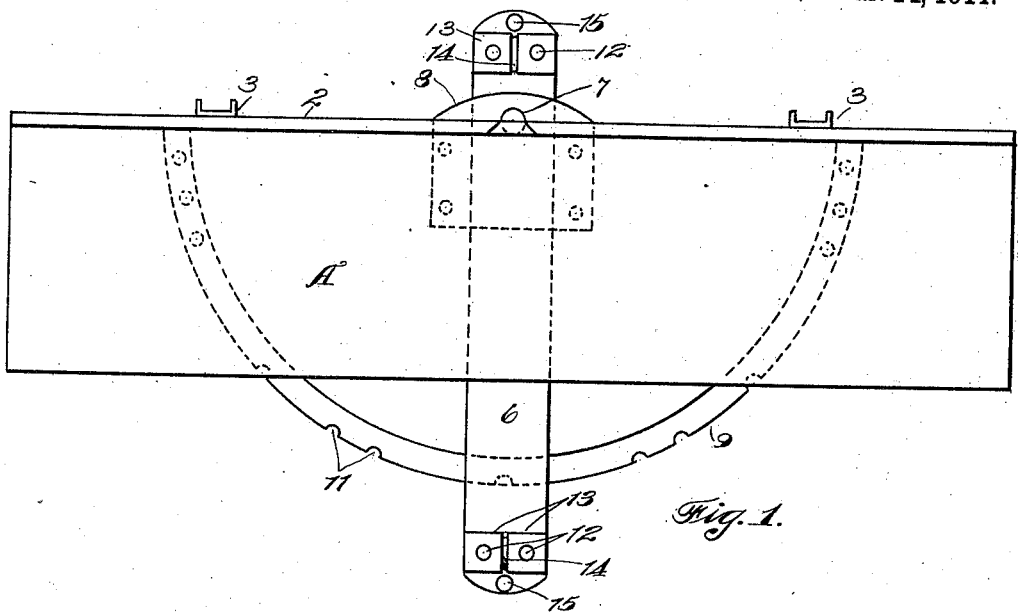
Figure 2:
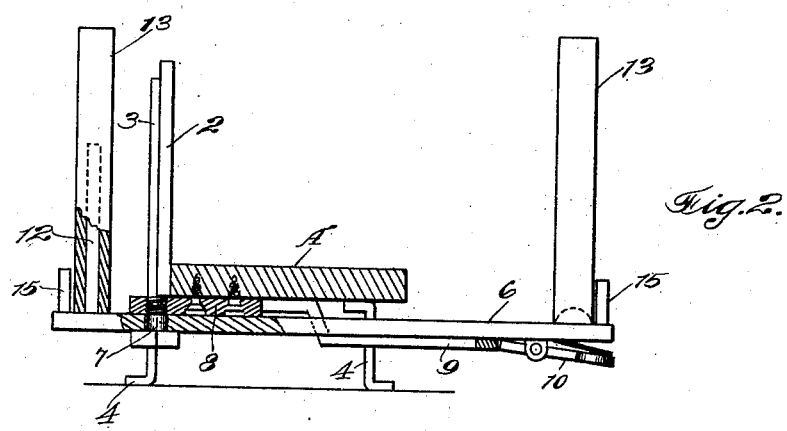
Figure 3:
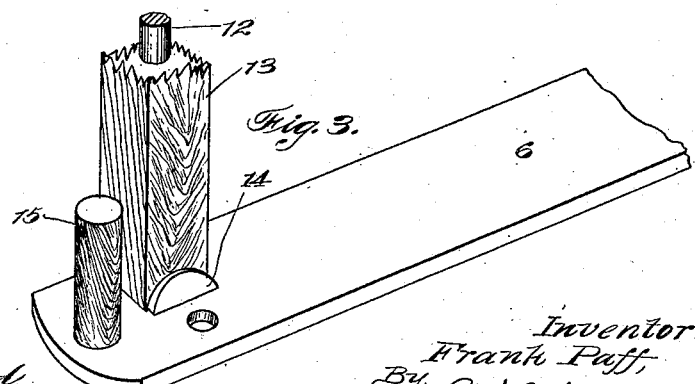

Figure 1 is a plan. Fig. 2 is an end view, partly in section. Fig. 3 is a perspective of the outer end of the saw carrier.

In the embodiment of the invention I employ a wooden bottom A and a rear vertical wooden side 2 suitably secured to the frame 3 having the legs 4, and which frame is preferably made up of channel or malleable iron.

6 is a saw carrier bar pivoted at 7 at one side and between the ends and on the under side of the bottom; a wearing plate 8 being secured to the bottom and interposed between the latter and the carrier bar 6.

9 is a segmental rack secured at its ends to the under side of the bottom A, and with the front curved portion dropped down underneath the carrier bar 6, so that the latter works over the rack 9; the rack 9 being concentric with the pivot 7. The carrier bar extends across underneath the bottom A and over the projecting dropped front of the rack 9, and is adapted to be locked at any suitable point in the circumference of the rack by suitable means, as the spring-actuated latch 10 engaging suitable notches 11 in the periphery of the rack.

Each end of the carrier bar 6 is provided with two spaced upright metal pins 12 adapted to form dowel members seating in sockets in corresponding square wood posts 13, each pair of posts being separated just the width of the saw blade, and the two pairs of posts adapted to have the slots formed between them aline and form suitable guides for the saw. The posts are prevented from turning by suitable means, as the rigid plate 14 which is approximately the same thickness as the saw blade; one of these stop plates 14 being carried at each end of the rack bar 6 and between its respective pair of pins 12.

15 is a short wooden post driven into a hole in each end of the carrier bar 6, or otherwise suitably secured thereto, these pins 15 being placed in line with the slots between the guide posts 13 and adapted to prevent the saw teeth from striking any of the metal parts of the device. The tops of these pins 15 do not extend above the level of the top of the bottom A, so as to allow the saw to saw clear through the timber supported in the miter box.

By lifting the latch 10 and turning the carrier bar 6, then releasing the latch, the box can be set to cut any desired angle. The four wooden uprights or saw guides 13 can be raised up on their pin supports 12 and then turned around so that all four sides can be used before they will have to be renewed. Manifestly the back 3 has a suitable slot to allow the saw to work through and permit the latter being set at the various angles desired.

Having thus described my invention, what I claim and desire to secure by Letters Patent is—

1. A miter box having a bottom and a back portion, and a pivoted saw carrier thereon, said saw carrier having renewable wood posts at its ends forming saw guides, said posts being square in cross-section and removably mounted on fixed pins on the saw carrier, with stop means on the saw carrier to prevent the turning of the posts, and renewable wood stop pins carried by the saw carrier and in line with the slots between the saw guides.

2. A miter box having a bottom and a back portion, and a pivoted saw carrier thereon, said saw carrier having renewable wood posts at its ends forming saw guides, said posts being square in cross-section and removably mounted on fixed pins on the saw carrier, with stop means on the saw carrier to prevent the turning of the posts, renewable wood stop pins carried by the saw carrier and in line with the slots between the saw guides, said saw carrier pivoted to the under side of the bottom and near one edge thereof and extending across the bottom, a segmental rack concentric with the pivot of the saw carrier and secured to the bottom and having a front portion dropped down beneath the carrier, and means for locking the carrier to the rack at any desired angle.

In testimony whereof I have hereunto set my hand in presence of two subscribing witnesses.

FRANK PAFF.

Witnesses:
   Charles A. Penfield,
   Charles Edelman.

Copies of this patent may be obtained for five cents each, by addressing the "Commissioner of Patents, Washington, D. C."